Aug. 11, 1959 M. ROSENBLATT ET AL 2,899,630
REGULATING SYSTEM FOR DYNAMOELECTRIC MACHINES
Filed Dec. 12, 1957 2 Sheets-Sheet 2

INVENTORS:
MURRAY ROSENBLATT,
ALAN S. RUBENSTEIN,
BY Melvin M. Goldenberg
THEIR ATTORNEY.

United States Patent Office 2,899,630
Patented Aug. 11, 1959

2,899,630

REGULATING SYSTEM FOR DYNAMOELECTRIC MACHINES

Murray Rosenblatt and Alan S. Rubenstein, Waynesboro, Va., assignors to General Electric Company, a corporation of New York Application December 12, 1957, Serial No. 702,280

6 Claims. (Cl. 322—25)

This invention relates to improvements in systems for controlling dynamoelectric machines in response to variations of the load thereon. More specifically, the invention is concerned with a novel system for regulating the output of alternating current generators and synchronous condensers in response to different quantities representative of the load thereon and for switching from one regulating apparatus to another.

Electrical generating systems, particularly those operated by public utilities, constitute integrated systems wherein a plurality of generators, some geographically separated, may be contributing electrical energy to the system. The size of the electrical generating equipment utilized in such systems involves considerable investment of funds and the load on the system usually requires the maximum utilization of all such equipment. This means that the amount of down time due to the performance of normal maintenance and/or repairs must be kept to a minimum. This requirement also extends to the apparatus which provides the excitation for the generator and the apparatus for regulating or controlling its output. It has been customary in order to meet this objective to provide a regulating system comprising an automatic regulator and a manual regulator such as a rheostat connected in series with the field of a self-excited exciter and means for switching from one to the other by an operator. However, manual regulation is not an acceptable means of controlling the high gain power amplifiers which may be used in modern excitation systems.

Therefore, it is an object of the invention to provide a novel dynamoelectric machine regulating system utilizing automatic means for providing regulation from one of two automatic regulators.

It is a further object of this invention to provide a novel regulating system including a first automatic regulator and second automatic regulator and means for comparing controlling signals supplied by the regulators in order that the regulation of a dynamoelectric machine may be effected from either one without creating a disturbance or unbalance on the system as a consequence of the change.

It is another object of this invention to provide a novel regulating system utilizing a first automatic regulator responsive to the excitation voltage of a dynamoelectric machine as a measure of the load thereon and a second automatic regulator responsive to the voltage output thereof as a measure of the load and means for comparing the controlling signals of the regulators and to switch from one regulator to the other at the proper time.

In the operation of electrical utility systems, a further practice is to provide synchronous condensers at various places throughout the system for the purpose of regulating voltage at a point in a system to improve the overall system power factor. Automatic regulators are customarily provided for these devices, yet when they are first put on the system or returned thereto after maintenance and/or repair, it is necessary to provide an amount of field excitation fixed by the parameters of the machine in order that the machine will subsequently pull into synchronism with the system. Therefore, it is necessary to provide controlled excitation for the field prior to connecting it to the system and desirable after the machine has been so connected to regulate in accordance with the load thereon.

Therefore, it is still another object of this invention to provide a novel regulating system wherein a synchronous condenser is initially excited by an exciter controlled by an adjustable automatic regulator responsive to the excitation thereof and is subsequently excited by the same exciter controlled by an automatic regulator responsive to the load on the machine together with means for comparing the amount of excitation control signal from each regulator and for switching the control from one to the other.

Briefly, the object of this invention are achieved in one embodiment by the provision of a first regulator whose output is responsive to departures of a dynamoelectric machine load from predetermined values and which output controls the magnitude and sense of the excitation of the generator. A second regulator compares a voltage derived from a reference source and a voltage directly proportional to the excitation supplied to the machine and controls the excitation in response to this comparison. Means are provided for comparing the control signals supplied by the two regulators and for switching from one to the other when their outputs are the same.

The subject matter which we regard as our invention is particularly pointed out and distinctly claimed in the concluding portion of this specification. Our invention, however, both as to its structure and method of operation together with further objects and advantages thereof may best be understood by reference to the following description taken in connection with the accompanying drawing in which:

Figure 1:
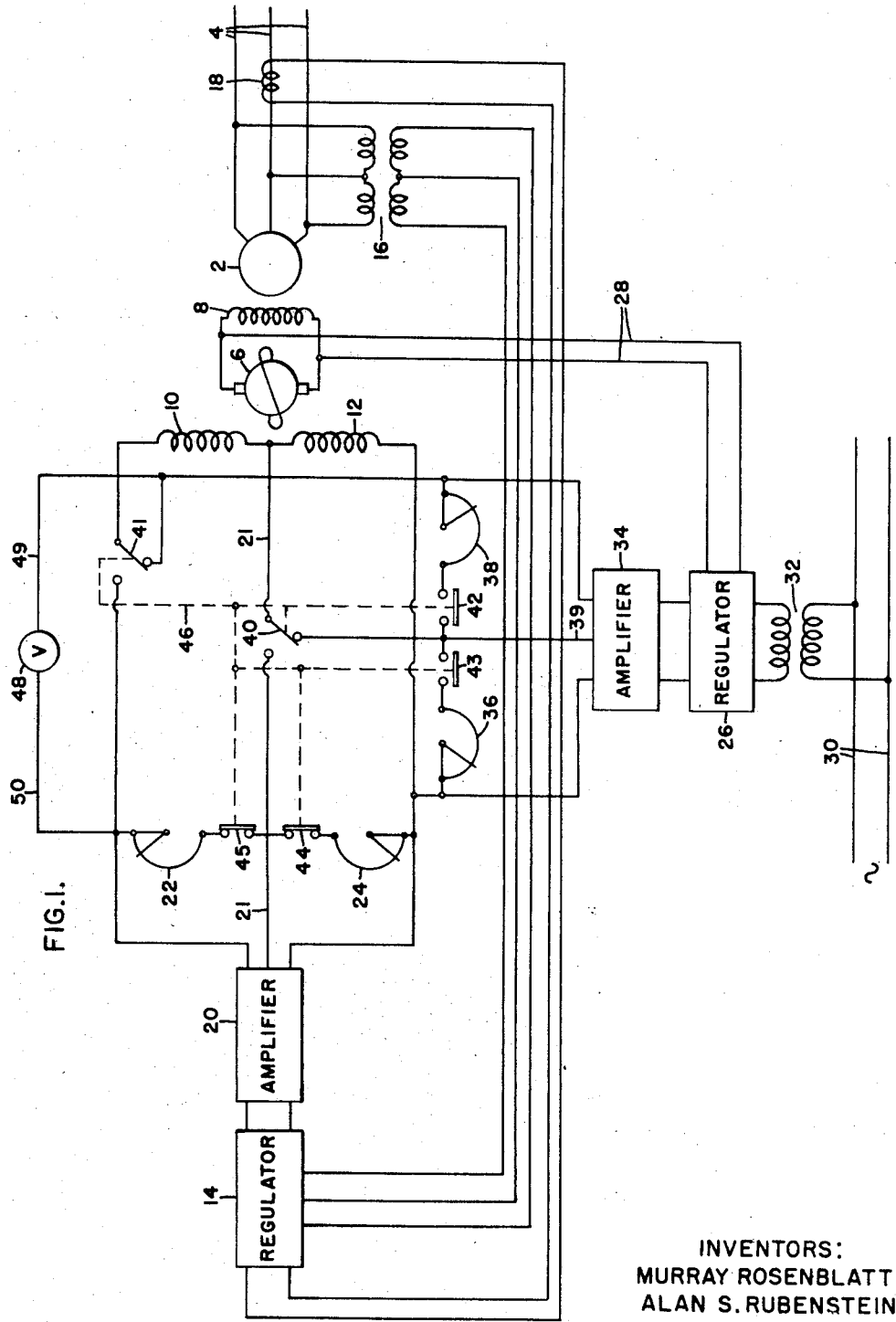
Fig. 1 is a schematic illustration of one embodiment of our invention.

In Fig. 1 of the drawing, there is shown a dynamoelectric machine illustrated as an alternating current generator 2 supplying an output via the buses 4 to a load, which load may comprise an electrical utility system also fed by generators from other sources. The excitation energy for the generator 2 is supplied in the illustrated embodiment by an amplidyne shown schematically at 6. The output of the amplidyne is in the form of D.C. voltage and is supplied to the excitation winding 8 of the generator 2. The amplidyne 6 in turn is controlled by a pair of fields 10 and 12, one field 10 supplying excitation for the amplidyne 6 in a direction to boost or increase its output voltage while the other field 12 supplies energy in a direction to buck or decrease its output voltage.

In accordance with out invention, the voltages in the buck and boost fields 10 and 12 are controlled in response to the output signal of a first or A.C. regulator 14 which derives signals proportional to the voltage of the generator from a means shown in the drawing as potential transformers 16 connected to the output buses 4. If desired, the regulator may be of the type combining a current and voltage signal in which a current transformer 18 may be connected across one of the buses 4 and coupled to the regulator 14. The regulator 14 compares the voltages proportion to the load voltage and current with a reference signal and supplies an error signal proportional to the difference therebetween to an amplifier 20. The amplifier 20 may take the form of one or more stages comprising a pair of magnetic amplifiers connected in push-pull arrangement and having a common connection 21 with the field 10 and 12 so that the output of one of the amplifiers when it is greater than the output of the other will cause the voltage in either the boost field 10 or buck field 12 to be greater than the voltage in the other field. An increase or decrease of the relative voltages in the fields 10 and 12 will increase or decrease the D.C. voltage in the excitation winding 8 of the generator thereby controlling the output of the generator in response to the magnitude and direction of departure of the load voltage and current from its normal relation to the reference as determined by the regulator 14. A rheostat 22 is connected across the boost field 10 while a rheostat 24 is connected across the buck field 12 in order to approximate the load imposed on the amplifier 20 by the field. While this is illustrated and described as the resistive elements 22 and 24, under some circumstances it may be found desirable to include inductive reactance devices for a more accurate approximation.

The particular regulating system utilized forms no part of our invention and may take any of the forms well known in the art inasmuch as it need only meet the requirement that it be responsive to the output of the dynamo-electric machine, that suitable means be provided whereby the voltage supplied therefrom to control the exciting apparatus can be measured and that means be provided which can be selectively connected to the output of the regulator to approximate the load imposed thereon by the exciter.

While in the normal course of events it is desirable to control the output of a generator such as shown at 2 in response to variations of the load thereon in order to maintain the constant output, as pointed out, the typical situation requires the provision of both standby regulators and exciters. In order to overcome the inability of manual regulators to control high gain power amplifier apparatus in the form of exciters for modern dynamoelectric machines, we provide a second adjustable automatic regulator. By the provision of this means and by further providing that the regulator be responsive to the output voltage of the exciter, it is possible to connect two such exciters in parallel so that excitation of the dynamoelectric machine can be obtained by suitable switching from either a regulator exciter or a standby exciter without removing the machine from the line.

In order to regulate the generator output in response to variations in the excitation current and to permit paralleling of two exciters, a second regulator for controlling the output of the generator is shown at 26 in the drawing. A pair of leads 28 are connected across the excitation field 8 of the generator and supply a voltage proportional to the excitation voltage to the regulator 26. A reference signal is derived from an independent alternating current source 30 and is connected by the transformer 32 to the regulator 26 wherein it is rectified and compared with a rectified signal from the leads 28. Means (not shown) are provided in the regulator 26 for adjusting the magnitude of the reference voltage. An error signal proportional to the difference between the voltage on the leads 28 and the reference signal is supplied to a push-pull amplifier 34 which may be similar to the amplifier 20. Rheostats 36 and 38 are provided for approximating the load imposed on the amplifier 34 similarly to the function of the rheostats 22 and 24. Switch means 40 and 41 are provided to connect the field windings 10 and 12 to either the output of the amplifier 20 or the amplifier 34. Switch contacts 42 and 43 are provided to connect or remove the rheostats 36 and 38 across the output of the amplifier 34 and are shown as open, while switch contacts 44 and 45 are provided to connect or remove the rheostats 22 and 24 across the amplifier 20 and are shown as closed. The switch contacts 40—45 may be mechanically connected together as shown by the dotted line 46 in Fig. 1.

When the generator 2 is being controlled by the regulator 26 and it is desired to permit its control by the regulator 14, in order that this may be done without creating deleterious disturbances on the system, our invention contemplates the provision of a means to compare the voltage supplied from the regulator 14 with the voltage from the regulator 26 and enable this transfer when the voltages are equal so that the transfer can be accomplished smoothly without such disturbances. In Fig. 1, this means constitutes a voltmeter 48 connected by a lead 49 to one side of the field windings 10 and 12 and by a lead 50 to the output from the amplifier 20. In the operation of this embodiment of the invention, the voltmeter 48 compares the output voltage of the regulator 26 with the output of the regulator 14. By a visual inspection of the values presented by the voltmeter, the operator can adjust the reference voltage controller of the regulator 14 until these output voltages are equal as indicated by a value of zero on the voltmeter 48, and can operate the switching means 40 to 45 to transfer the control of the amplidyne field windings 10 and 12 from one of the regulators to the other. Similarly, when it is desired to transfer control of the machine from the regulator 14 to the regulator 26, the reference voltage controller of the regulator 26 may be adjusted and the contacts 40 to 45 operated in the reverse direction.

Figure 2:
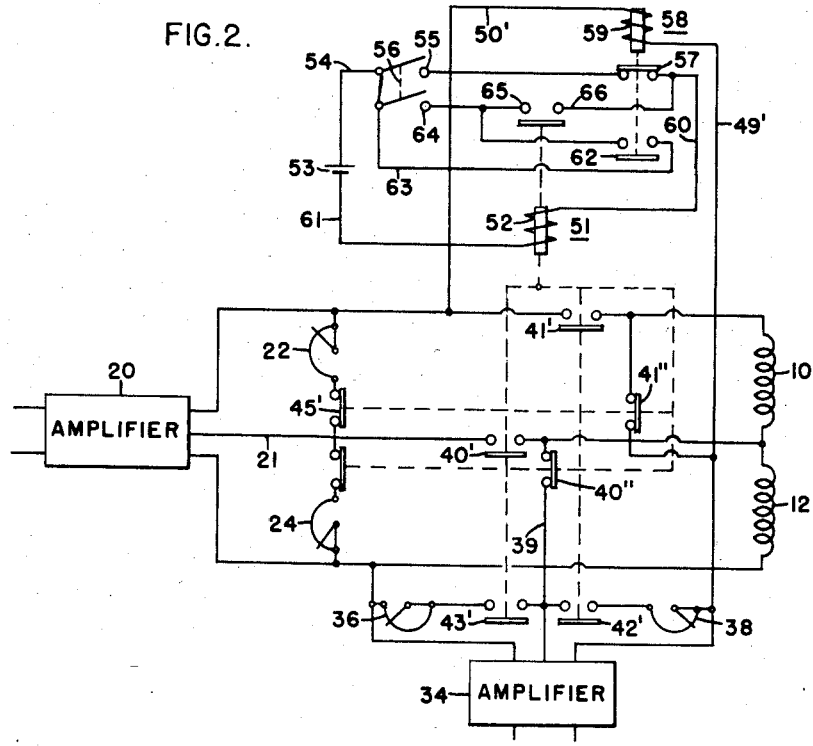
Fig. 2 is a schematic illustration of an alternative embodiment of a portion of our invention.

Fig. 2 of the drawing illustrates another embodiment of the invention and elements therein common to Fig. 1 are designated by the same reference numerals as shown in Fig. 1. In this embodiment of our invention there is provided an automatic control circuit comprising a relay 51 having a winding 52. A source of operation potential 53 is connected via a conductor 54, contacts 55 of a switch 56, normally closed contacts 57 of a relay 58 having a winding 59 and conductor 60 to the winding 52 of the relay 51, a conductor 61 returns the other side of the winding 52 to the source 53. The relay 58 also operates the normally open contacts 62 in a conductor 63 connected to the source 53 through conductor 54, contacts 64 of switch 56, contacts 65 of relay 51 in a conductor 66 connecting the contacts 64 to the conductor 60. Normally closed contacts 44' and 45' of the relay 51 connect the rheostats 22 and 24 across the amplifier 20 while normally open contacts 42' and 43' can connect the rheostats 36 and 38 across the output of the amplifier 34. Normally open contacts 40' and 41' of the relay 51 can connect the output of the amplifier 20 to the fields 10 and 12 while the normally closed contacts 40" and 41" connect the output of the amplifier 34 thereto.

In the operation of this embodiment of our invention, the relay 58 is of the type such that it drops out when the voltage across its winding 59 is zero. This situation, as explained, exists when the voltage outputs of the two amplifiers 20 and 34 are equal. In order that the relay 58 may measure this voltage, it is connected by the conductors 49' and 50' similarly to the connections of the conductors 49 and 50 in Fig. 1.

As shown in the drawing, when the switch 56 is open and if the output voltages of the two regulators are equal, the voltage across the winding 59 of the relay is zero. Under these conditions, the relay 51 is de-energized. When the winding 52 is de-energized, the contacts 40', 40", 41', 41", 42', 43', 44' and 45' are in the positions illustrated and the exciter fields 10 and 12 are controlled by the regulator 26 through the amplifier 34. When it is desired to transfer control from the regulator 26 to the regulator 14, the switch 56 is closed and if the voltages across the amplifiers 34 and 20 are equal, the voltage across the winding 59 is zero so that the contact 57 is closed. This completes a circuit through the conductors 60, winding 52 and conductors 61 to energize the relay 51 reversing the condition of the contacts 40', 40", 41', 41", 42', 43', 44' and 45' to cause the fields 10 and 12 to be controlled by the output of the amplifier 20. The pickup of the relay 51 also closes the contacts 65. If the voltage across the winding 59 subsequently does not equal to zero by choice or otherwise, the relay 58 picks up closing the contact 62 and opening the contact 57. The closing of the contact 62 completes a sealing-in circuit for the winding 52 through the conductor 54, conductor 63, now closed contacts 62, closed contacts 65, conductor 60 and conductor 61.

When it is desired to transfer control from the regulator 14 to the regulator 26, the switch 56 is opened. The reference voltage controller of the regulator 26 is adjusted until the voltage across winding 59 equals zero, at which point the relay 58 drops out opening the contact 62 to cause the relay 51 to drop out re-establishing the condition of the contacts 40', 40'', 41', 41'', 42', 43', 44' and 45' illustrated in the drawing.

If desired, motor means subject to the control of a relay may be provided to adjust the reference setting elements of the regulator which it is desired to have assume control in such amounts and direction to balance the voltage outputs of the two amplifiers 20 and 34. In this arrangement, a relay responsive to both the polarity and magnitude of the voltages across the fields and load approximating elements together with suitable controlling contacts must be provided instead of the relay 58.

In the illustrated embodiments of the invention, the two regulators are shown controlling the same fields of the dynamoelectric machine exciter. If the exciter is provided with separate fields having separate sources of control or regulation, it is only necessary to provide a suitable differential relay measuring the net ampere turns of each field or fields and effecting the switching function when they are equal to each other. Alternatively, in such a system a magnetic amplifier including a pair of control windings wherein the current flow is proportional to the ampere turns of each field may be used to supply a control to effect the switching at the proper time.

Figure 3:
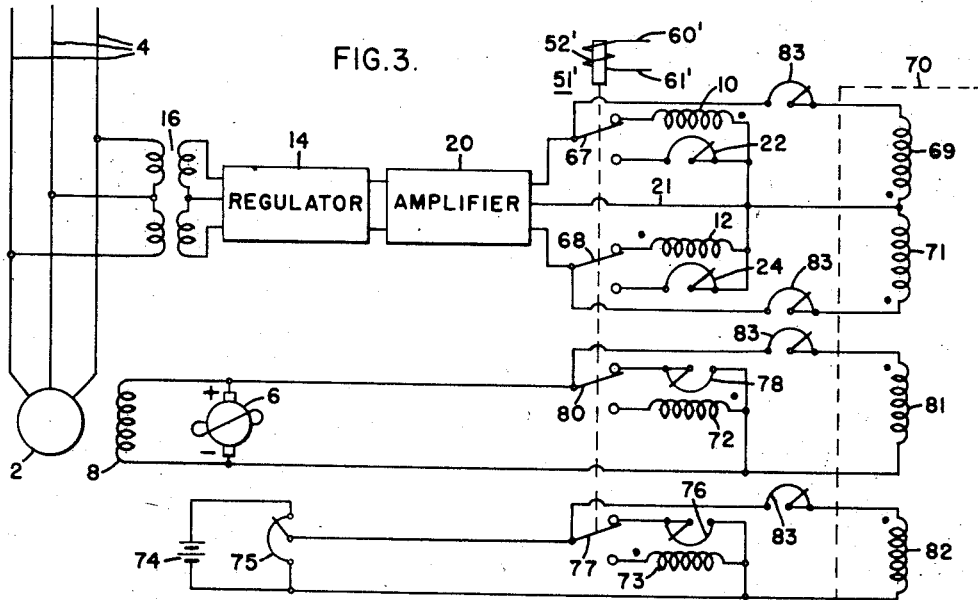
Fig. 3 is a schematic illustration of still another embodiment of our invention.

Fig. 3 illustrates a system of this type. In this figure, the elements common to Figs. 1 and 2 have been given the same reference numeral while they are shown schematically for simplicity of illustration. As in Fig. 1, the regulator 14 supplies a control signal to the amplifier 20. The output of the amplifier 20 may be connected by the switches 67 or 68 to either the dummy loads 22 and 24 or to the exciter control fields 10 and 12. Depending on which is connected by the switch 67 to the amplifier 20, a control winding 69 of an excitation measuring device 70 is connected across either the exciter field 10 or the rheostat 22. A control winding 71 is similarly connected across either the exciter field 12 or the rheostat 24.

In this form of the invention, the second regulator takes the form of a separate negative feedback field 72 and a separate field 73 supplied from a reference constituted by a source of potential such as a battery 74 and potentiometer 75. The voltage derived from the adjustable slider on the potentiometer 75 is supplied to either the field 73 or a load approximating rheostat 16 depending on the position of a switch 77. Likewise, the voltage fed back by the amplidyne 6 is supplied to either the field 72 or a load approximating rheostat 78 depending on the setting of a switch 80. As may be seen in the drawing, the positive terminal of the amplidyne 6 is connected to the field 72 and an increase in the voltage thereof functions to reduce the excitation of the amplidyne while an increase in the voltage of the reference source (battery 74 and potentiometer 75) tends to increase the excitation of the amplidyne. As is well known in the art, the setting of potentiometer 75 establishes the operating point of the amplidyne 6 and, therefore, the two fields 72 and 73 function as a regulator for the generator 2. Control windings 81 and 82 are connected across either the field 72 or rheostat 78 and field 73 or rheostat 76 respectively depending on the positions of the switches 80 and 77. A rheostat 83 is connected in series with each of the windings 69, 71, 81 and 82 so that the effect of each of the ampere turns in the fields 10, 12, 72 and 73 may be weighed in their effect on the control windings.

As stated above, the control windings 69, 71, 81 and 82 may constitute the windings on a relay similar to relay 58 in Fig. 2 so that the net voltage therein will equal zero when the ampere turns of the fields 10 and 12 equal the voltage across the rheostats 78 and 76 or when the ampere turns of the fields 72 and 73 equal the voltage across the rheostats 22 and 24. Alternatively, the control windings 69, 71, 81 and 82 may control current in a magnetic amplifier in such a way as to result in zero current when the above conditions exist and a relay such as shown at 58 but having a single winding may be controlled thereby.

Although in accordance with the provisions of the patent statutes this invention is described as embodied in concrete form and the principle has been explained together with the best mode it is now contemplated applying that principle, it will be understood that the apparatus shown and described is merely illustrative and the invention is not limited thereto since alterations and modifications will readily suggest themselves to persons skilled in the art without departing from the true spirit of the invention or from the scope of the annexed claims.

What we claim as new and desire to secure by Letters Patent of the United States is:

1. In combination, a dynamoelectric machine for supplying a load and having a source of excitation voltage, a first regulator for controlling the excitation of said machine, said first regulator including means responsive to changes in the load, a second regulator for controlling the excitation of said machine, said second regulator including means responsive to changes in the excitation of said machine, means for comparing the outputs of said first and second regulators and means for transferring control of the excitation from one of said regulators to the other when their outputs are equal.

2. In combination, a dynamoelectric machine for supplying a load, excitation means for said machine, a first regulator for controlling said excitation means in response to changes in said load, a second regulator for controlling said excitation means in response to changes of voltage thereof, means for measuring the effect on said excitation means of said first and second regulators and means for transferring control of said excitation from one of said regulators to the other of said regulators when said effects are equal.

3. In combination, a dynamoelectric machine, means for supplying a direct current excitation signal to said machine, a first regulator responsive to the variations in the load on said machine for controlling the output of said means, a second regulator responsive to variations in said direct current excitation signal for controlling the output of said means, means for measuring the effect of said first and second regulators on said first-mentioned means, and means for transferring control of said first-mentioned means from one of said regulators to the other of said regulators when their effects are equal.

4. In combination, a dynamoelectric machine including a direct current winding, a source of direct current for said winding, a first regulator having an input circuit and an output circuit, means for supplying voltages proportional to the output voltage and current of said generator to said input circuit, means coupling said output circuit to said source for controlling said source, a second regulator having an input circuit and an output circuit, means for supplying a voltage proportional to the voltage in said direct current winding to said input circuit of said second regulator, means for coupling said output circuit of said second regulator to said source for controlling said source, means for comparing the voltages of said output circuits and for transferring the control of said source from one of said regulators to the other when the voltages of said output circuits are in a proper proportion.

5. In combination, a dynamoelectric machine having a direct current winding, a source of direct current for exciting said winding, a first regulator having an input circuit and an output circuit, means for supplying a voltage proportional to the terminal voltage of said generator to said input circuit, a second regulator having an input circuit and an output circuit, means for supplying a voltage proportional to the voltage of said source to said second regulator input circuit, means for comparing the voltage of said first regulator output circuit and said second regulator circuit, means for controlling the voltage of said source, and switch means for connecting one of said output circuits to said last-mentioned means and disconnecting the other when voltages of said output circuits are equal.

6. In combination, a dynamoelectric machine having a direct current winding, a source of direct current for exciting said winding, control fields for said source, a first regulator having an input circuit and an output circuit, means for supplying a voltage proportional to the terminal voltage of said generator to said input circuit, a second regulator having an input circuit and an output circuit, means for supplying a voltage proportional to the voltage of said source to said second regulator input circuit, means selectively connectable across the output of said first regulator for approximating said direct current winding, means selectively connectable across the output of said second regulator for approximating said direct current winding, means for measuring the effect of one of said regulators on said source and the effect of the other regulator on one of said approximating means and switch means for connecting one of said output circuits to said control fields and disconnecting the other from said control fields when the effects of said regulators on said source and said approximating means are equal.

References Cited in the file of this patent

UNITED STATES PATENTS

| | | |
|---|---|---|
| 2,251,683 | Logan | Aug. 5, 1941 |
| 2,571,827 | Bradley | Oct. 16, 1951 |